United States Patent [19]

Tommasino et al.

[11] 4,330,710

[45] May 18, 1982

[54] APPARATUS AND METHOD FOR THE DOSIMETRY OF NEUTRONS

[75] Inventors: Luigi Tommasino, Rome; Giorgio Zapparoli, Anguillara, both of Italy

[73] Assignee: Comitato Nazionale per l'Energia Nucleare-CNEN, Rome, Italy

[21] Appl. No.: 906,598

[22] Filed: May 16, 1978

[30] Foreign Application Priority Data

May 20, 1977 [IT] Italy .............................. 49495 A/77

[51] Int. Cl.² .......................... G01T 5/00; G01T 3/00
[52] U.S. Cl. .................................... 250/472; 250/390
[58] Field of Search ................ 250/472, 473, 474, 390

[56] References Cited

U.S. PATENT DOCUMENTS

| | | | |
|---|---|---|---|
| 2,938,121 | 5/1960 | Fitzgerald et al. | 250/472 |
| 3,461,288 | 8/1969 | Oster | 250/472 |
| 3,735,135 | 5/1973 | Bredoux et al. | 250/472 |

FOREIGN PATENT DOCUMENTS 929339  7/1970  Italy .

*Primary Examiner*—Alfred E. Smith
*Assistant Examiner*—Janice A. Howell
*Attorney, Agent, or Firm*—Stevens, Davis, Miller & Mosher

[57] ABSTRACT

An apparatus for the dosimetry of fast neutrons comprises one or more personal detectors in the form of test tubes made of transparent insulating material and a tank with a holder for suspending said test tubes in an upright position within the tank all at the same level. After exposure of said test tubes to radiation of fast neutrons, they are placed in the tank and filled with an electrolyte into which an electrode is immersed. The tank also is filled with the same liquid up to the same level as the test tubes and an electrode is immersed also into the liquid within the tank. The electrodes within the test tubes are collectively connected to one terminal of a high voltage alternating or pulsating function generator of which the other terminal connects with the electrode within the tank. The tracks of damage by said neutrons are thus developed to the required extent and subsequently inspected for evaluating the amount of the traces of damage.

Different forms of the test tubes are disclosed.

14 Claims, 8 Drawing Figures

Fig. 3    Fig. 5    Fig. 7
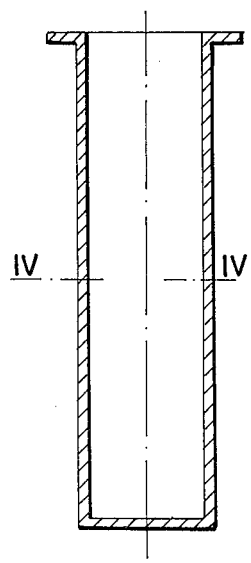 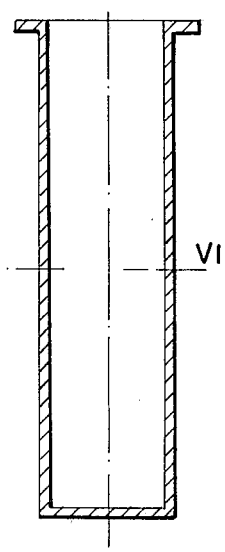 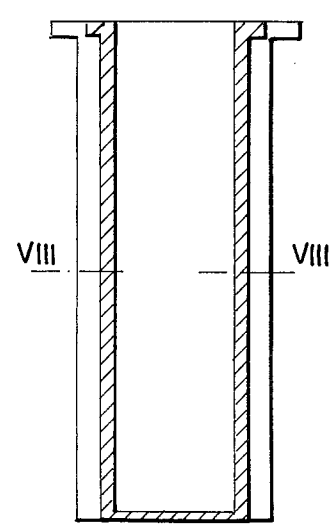
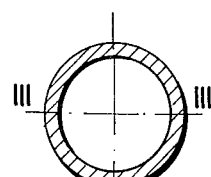 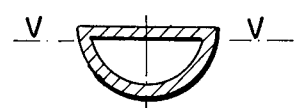 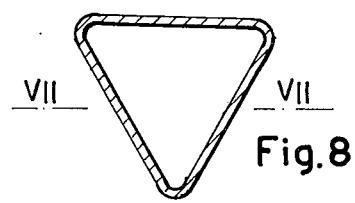
Fig. 4    Fig. 6    Fig. 8

APPARATUS AND METHOD FOR THE DOSIMETRY OF NEUTRONS

This invention relates to a novel apparatus for neutron detection by development of latent damage tracks caused by neutron bombardment of transparent insulating materials.

The apparatus comprises a personal dosimetric detector of novel type and a novel device for the electrochemical development of damage tracks produced by neutrons over the surface of said dosimetric detector.

It is known that the technique of detecting fast neutrons by means of personal detectors is very complicated problem and that no efficient approach thereto has been proposed up to now.

A personal dosimeter of fast neutrons should be:
1. Compact, inexpensive, light and readily available;
2. Insensitive to X, gamma and beta rays;
3. Capable of totalizing neutron doses over a consistent time period;
4. Adapted for providing responses independent of environment conditions (humidity, light, temperature);
5. Capable of detecting ~ 0.001 rad doses;
6. Adapted for providing a response proportional to the rad or rem dose at the different neutron energies;
7. Adapted for providing a response independent of the neutron beam direction;
8. Adapted for being readily interpreted. In fact a dosimetry service could imply the development and interpretation of thousand dosimeters.

For the personal dosimetry of fast neutrons nuclear emulsions are used in some countries, although only the conditions of para 1 are satisfied by them and none of the above paragraphs 2-8.

Another method of detecting fast neutrons comprises exposing a slide of dielectric or insulating material to the neutron bombardment and subsequently developing the latent tracks by means of chemical reagents which attack said insulating material and widen said traces to such an extent that they become visible through a high power microscope. However the sensitiveness of the above method is limited by the fact that the development of tracks by chemical attack alone is limited. Furthermore, while a number of insulating materials are available well adapted from every other standpoint to this use, they show only microscopic rings when subjected to a chemical attack alone.

A substantial advancement has been achieved in this field by the method and apparatus for the development of tracks of damage produced by nuclear particles in insulating transparent materials disclosed by Italian Pat. No. 929,339 dated on July 6, 1970 of which the inventor is one of the inventors of this application.

By said method and apparatus, a chemical reagent is used for attacking the surface of the dosimetric detector, the same as with the prior art techniques; but differently from the prior art, the fact is thereby exploited that the liquid reagent used for attacking the detector comprises an electrolyte that is an electricity conducting liquid whereby, when it enters the nuclear tracks, it transforms them into needlelike conducting paths which penetrate the insulating sheet surface.

By applying alternate electric fields across the irradiated insulating sheet inserted between two liquid reagent containing cells, breakdowns are produced at the pointed ends of the tracks whereby a certain amount of energy is deposited over the damaged areas. Such breakdown phenomena are known as treeing and have been often observed at the ends of needles driven into dielectric materials. Therefore, said tracks of damage can be enlarged by the combined action of said treeing and of the electrochemical development to such an extent that they become visible to the naked eye.

In practice, according to the above Patent, a dosimetric detector comprises a sheet of insulating transparent material to be exposed to radiation by ionizing charged particles. Subsequent to the exposure, the sheet is interposed between two cells of insulating material wherein the reagent is contained for developing the tracks, which should be an electricity conducting reagent. The cells are provided each with an opening at the center position of its wall facing the insulating material sheet, the two openings being in alignment, so that the liquid within the cells can contact both the sheet faces over the same area. A function generator provides high voltage sinusoidal waveforms or square pulses to two electrodes directly sunk into the reagent within the two respective cells.

By the method of the electrochemical attack as disclosed in the above mentioned Patent, the latent tracks of nuclear particles, which are submicroscopic at the beginning, can be developed to such an extent as to be visible to the naked eye.

Specifically, by said method, the neutron dose is measured by a naked eye count or by low power microscope count of the nuclear tracks produced in the insulating transparent material by the recoil reactions—or (n,d), (n,f) reactions—of said neutrons.

It has been found that the current apparatus conforming to the above patent offers many advantages but suffers from two severe limitations in the personal dosimetry of neutrons.
(a) The dosimeter response is too much dependent on the direction of the neutron beam;
(b) There are problems when a number of dosimeters are to be developed due to the complicated structure of the development apparatus presently available.

A first object of the present invention is therefore to provide a neutron dosimeter with a response independent of the direction of the neutron beam.

A further object of this invention is to provide an apparatus for the electrochemical development of the tracks, whereby most problems related to the development of a large number of dosimeters are solved.

According to this invention, a dosimeter is provided which—instead of being in the form of a sheet as described in the cited patent—is in the form of a cylindrical tube with hemispherical bottom—which hereinafter will be referred to as test tube— of which the wall thickness will be as much as possible constant; the tube material being the same as the dosimeter sheet of the above mentioned patent, that is adapted for detecting nuclear tracks.

Differently from the sheet dosimeter of which the response is significantly dependent on the direction of the neutron beam, the tube dosimeter of this invention provides a response substantially independent of the neutron beam direction.

Still according to this invention, in addition to functioning as a neutron detector, the test tube can be advantageously used in combination with a device for the development of tracks much simpler and much more practical than that of the above cited patent.

According to this invention, the cylindrical test tube of transparent insulating material, after being exposed to neutron radiation, is immersed into a tank in which the appropriate chemical reagent is contained for the electrochemical development of nuclear tracks. Still according to this invention, the test tube is filled with the same chemical reagent up to a level such that the insulation between the two reagent masses, respectively outside and inside the tube, is not impaired. A function generator provides high voltage waveforms which may be sinusoidal, square or pulsated, all of which controllable in amplitude and frequency.

Said high voltage waveforms are applied across the wall of the previously irradiated test tube by means of two electrodes made of platinum or any other conducting material not chemically attackable by the reagent employed.

Said electrodes are immersed in the chemical reagent within the tank and within the test tube respectively. The tank is maintained at constant temperature in as much as the electrochemical development is dependent on the reagent temperature. According to this invention, the number of test tubes to be immersed into the tank for simultaneous electrochemical development can be increased at will provided that an electrode is immersed into the liquid contained in each test tube.

The high voltage function generator output is applied to the electrode immersed into the tank on one side and to all the electrodes collectively of the different test tubes on the other side. Again according to this invention, the cylindrical test tube subsequent to the electrochemical development can be analized by means of a light beam parallel to the test tube longitudinal axis and originating from a source outside of the test tube opening.

In such conditions the damage areas electrochemically developed are readily visible to the naked eye even if their diameters are only a few tens of micron.

According to a variant of the dosimeter and apparatus of this invention, the test tube, being still cylindrical, may have a flat bottom the thickness of the tube and bottom being uniform throughout. With a flat bottom test tube, subsequent to development, the bottom can be cut off and projected by means of any diapositive projector or magnified by means of a microphotograph viewer for facilitating the count of the damage tracks. According to another variant of the dosimeter and apparatus of this invention, the flat bottom test tube has a semicylindrical form. A further variant comprises a dosimeter in the form of a triangular prismatic hollow tube with flat bottom.

Some variants are also provided for the development apparatus which variants are based on the fact that the tracks of damage are distributed at random in the mass of the test tube and specifically they are present both at the inner surface and at the outer surface of the dosimeter.

Therefore, for the detection of tracks of damage it is also possible to develop the tracks just over the inner surface or just over the outer surface of the dosimeter.

In practice the liquid reagent can be brought to contact indifferently either one of the two surfaces provided obviously that a conducting liquid is brought to contact the other surface.

In other terms, in addition to the procedure of supplying the reagent to both the tank and the test tubes, the reagent can be replaced with a simply conducting liquid in either the tank or the tube.

Obviously, when only one surface is developed the detector sensitiveness is halved.

This invention will be better understood from the following description and drawings which illustrate a neutron dosimeter and apparatus for the development of tracks of damage according to this invention. In the drawings:

FIG. 3 shows the vertical axial section of a cylindrical test tube with flat bottom according to this invention;

FIG. 4 is a cross section of the test tube of FIG. 3 along line IV—IV of the same;

FIG. 5 is a cross section along line V—V of FIG. 6 of a semicylindrical test tube with flat bottom;

FIG. 6 is a cross section of the test tube of FIG. 5 along line VI—VI of the same figure;

FIG. 7 is a cross section along line VII—VII of FIG. 8, of a triangular prismatic test tube with flat bottom;

FIG. 8 is a cross section of the test tube of FIG. 7 along line VIII—VIII of the same figure.

Figure 1:
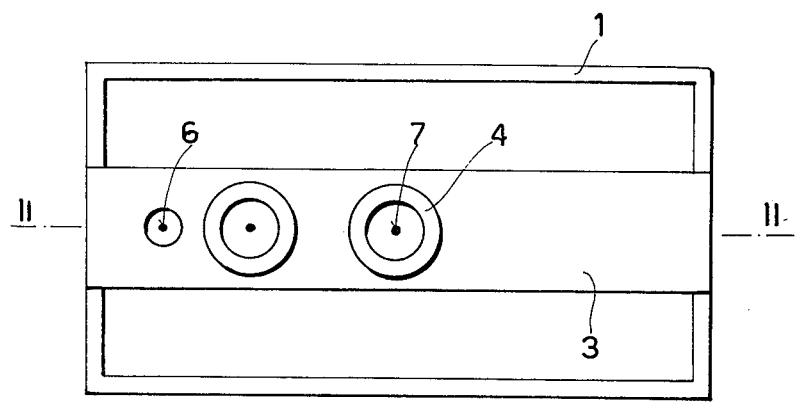
FIG. 1 is a top plan view of the apparatus for the electrochemical development of tracks of damage on two test tubes according to the invention.
Figure 2:
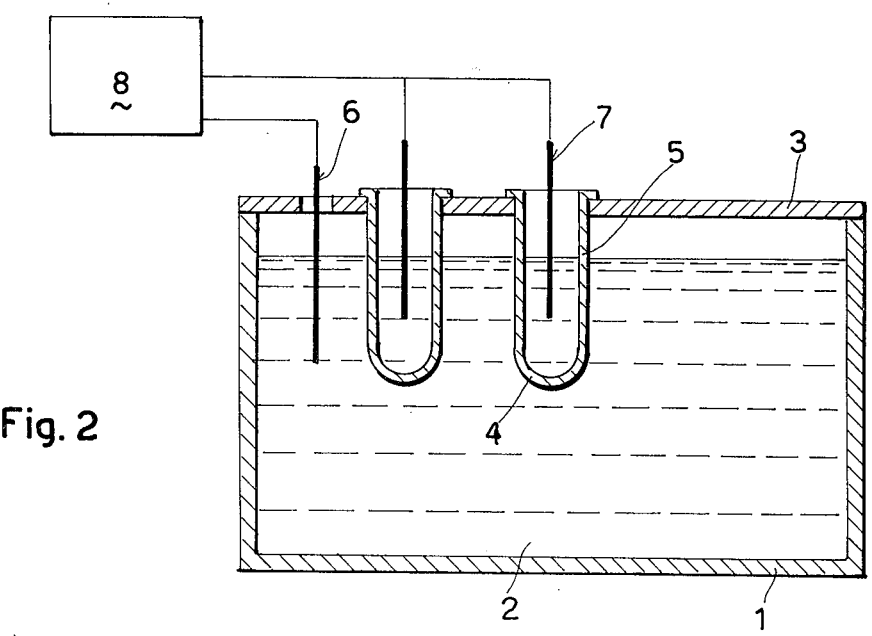
FIG. 2 is a vertical cross section along line II—II of FIG. 1 of the apparatus for the electrochemical development of tracks of damage with the related function generator shown in diagram form.

With reference to FIGS. 1 and 2, the apparatus is shown therein for the electrochemical development of tracks of damage according to the invention. It comprises a tank 1 in which the liquid chemical reagent is contained adapted for said electrochemical development, a detector holder 3 for keeping the tubes perpendicular to the tank 1 bottom, which tubes are only two in this example, but may be any number; a high voltage function generator 8 connected respectively to an electrode 6 immersed into the liquid of tank 1 and collectively to electrodes 7 which are immersed into the liquid 5 within the dosimeters. The alternated or pulsated current from generator 8 is thus brought to act across each test tube 4 previously irradiated and to be examined for tracks of damage. The liquid levels 2 and 5 respectively inside of tank 1 and inside of test tubes 4 should be lower than the tube opening so that the electric insulation between the two conducting liquids inside and outside of said tubes is ensured by the tube material itself. Furthermore, the two liquids should be at the same level.

Because tank 1 is to be maintained at a constant temperature during the electrochemical development, it can be placed in a thermostat controlled chamber.

With reference to FIGS. 3-8 several forms of the dosimeter of this invention are shown therein. In general, it comprises a cylindrical or semicylindrical or prismatic tube of insulating transparent material adapted for the detection of nuclear tracks for instance a polycarbonate.

In determining the test tube shape the requirement is kept in mind of providing a response substantially independent of the direction of the neutron beam. In addition, no mechanical inner stresses should exist within the mass of the tube material, which stresses could be caused by the manufacturing steps, and this because such stresses could originate therein effects similar to those produced by neutron irradiation. Lastly, the cost of the tube is not to be disregarded and then a tube should be preferably adopted which is already mass-produced for other uses, for instance a centrifuge test tube or anyway a test tube for chemical or biological laboratory. The tube shapes suggested in FIGS. 2-8 are in the order: cylindrical with hemispherical bottom, cylindrical or semi-cylindrical with flat bottoms, prismatic with triangular cross section and flat bottom.

From the economy standpoint a simple cylindrical tube open at its ends would be the less expensive but a fluidtight sealing should be provided at one end thereof which should ensure the separation between the outside and the inside liquids when the tube is immersed into the tank.

Test tube 4 should anyway be provided with a lip for engaging holder 3 of the development apparatus.

For electrochemically developing the tracks of damage produced in the insulating transparent material of the neutron tubelike dosimeters according to this invention, the apparatus of FIGS. 1 and 2 is operated as follows:

Tank 1 is filled with liquid reagent for the chemical development of the tracks, when the outer surface of said test tubes are to be developed or with simply conducting liquid when the inner surfaces of said test tubes are to be developed. Lastly both tank 1 and tubes 4 are filled with liquid reagent when both the outer and inner surfaces of the tubes are to be developed. Test tubes 4 are then immersed into the tank and held firmly upright by means of holder 3 and subsequently filled with liquid reagent if their inner surface is to be developed or with simply conducting liquid if their outer surface is to be developed. The levels of the liquids inside and outside of the test tubes should be the same and such that the insulation therebetween is ensured by the dry portion of the tube. Subsequently electrode 6 is immersed into the liquid of tank 1 and one electrode 7 is immersed into the liquid of each test tube 4; tank 1 is then placed into a thermostat controlled chamber and electrodes 6 and 7 are connected to source 8 of pulsated or alternating voltage for a length of time as required for developing said tracks to the desired extent, which time period is dependent on: (a) the frequency and the effective value of the applied voltage, which are both maintained constant for the whole duration of the electrochemical attack; (b) the kind and concentration of the liquid reagent; (c) the kind and thickness of the test tube material; (d) the temperature of the chemical reagent, which temperature is maintained constant during the electrochemical attack by said thermostat.

The above method is applicable to all the types of test tube disclosed hereinbefore. Said test tubes 4 subsequent to the electrochemical development, are inspected by means of either a beam of light parallel to the longitudinal axis of the test tube or by means of conventional manual or automatic optical procedures.

During the electrochemical development the test tube wall may be perforated, if the developing attack is too much protracted. Such an event is manifestly evidenced by a sudden increase of the current across the electrodes. It is within the conventional art to exploit such current increase for actuating a detector means whereby the punctured tube can be singled out and removed. Such detecting means, which can be optical or acoustical, may be connected in series with each of the electrodes sunk into the tubes.

EXAMPLE

An apparatus has been developed according to this invention conforming to the following specification:

(a) A developing apparatus comprising a stainless steel tank 30×20 cm in plan view 15 cm high; a generator adapted for providing 3000 volt peak amplitude sinusoidal current at 10 KHz frequency;

(b) a KOH 30% solution both inside the tank and inside the test tubes;

(c) a set of cylindrical test tubes with round bottom 1.5 cm O.D., 8 cm long, 1 mm thick, made of polycarbonate MAKROLON (trademark by Bayer).

The test tubes irradiated with 14 Mev energy neutrons at a dose of 0.1 rad have been developed by means of the above apparatus for 4 hours at 25° C.

Recoil traces have been obtained with 100 micron average diameter.

Thus a preferred embodiment of the invention has been described as an example thereof.

It will be readily understood that a number of modifications and variants thereto can be envisaged by those skilled in the art. This applies mainly to the form of the dosimeter or test tube. Saving the above mentioned requirements, about the form of the test tube, which must be a tube of generically cylindrical or prismatic form, the rest of it is susceptible to several variants. The test tube may have hemispherical or flat bottom or may even lack it, in which case, as already mentioned, a fluidtight sealing must be provided. The tube cross section may be other than circular, semicircular or triangular as illustrated; for instance, it may be elliptical or parabolical.

The test tube bottom in addition to being hemispherical or flat, as in the above examples may have other forms. Therefore the attached claims are intended for covering all such modifications and variants which are made in the true spirit of the invention.

What we claim is:

1. An apparatus for developing the nuclear tracks by neutrons in a tubular dosimeter closed at one end and made of transparent non-pierced dielectric material by means of an electrolyte capable of chemically attacking said material by means of a non-constant high voltage applied to said electrolyte, which apparatus comprises:

a liquid tight tank filled with electrically conducting liquid and not attackable by said liquid nor by said electrolyte;

a holder in said tank for keeping said dosimeter upright and immersible in said liquid for a substantial section of its length, said dosimeter being filled with electrically conducting liquid; at least one of said electrically conducting liquids being an electrolyte capable of chemically attacking the dosimeter material;

an electrode immersed into the liquid within the tank;

an electrode positioned in said dosimeter; and a generator of high voltage not constant in value connected respectively to the electrode of said tank and to the electrode of the dosimeter.

2. An apparatus as claimed in claim 1, wherein said electrolyte is in said tank and said electrically conducting liquid is in said dosimeter.

3. An apparatus as claimed in claim 1, wherein said electrolyte is in said dosimeter and said electrically conducting liquid is in said tank.

4. An apparatus as claimed in claim 1, wherein said electrolyte is in both said dosimeter and said tank.

5. An apparatus as claimed in claim 1, wherein said dosimeter comprises a receptacle in the form of a test tube with a hemispheric bottom.

6. An apparatus as claimed in claim 1, wherein said dosimeter is provided at its end opposed to the closed end with an outwardly projecting lip.

7. An apparatus as claimed in claim 1, wherein said dosimeter is free from mechanical stresses within its structural material.

8. An apparatus as claimed in claim 1, wherein said dosimeter comprises a circular cylindrical tube closed at one end thereof by a flat wall.

9. An apparatus as claimed in claim 1, wherein said dosimeter comprises a semi-cylindrical tube closed at one end by a flat wall.

10. An apparatus as claimed in claim 1, wherein said dosimeter comprises a triangular prismatic tube closed at one end by a flat wall.

11. An apparatus as claimed in one of claims 2, 3 and 4, wherein said electrolyte comprises a reagent adapted for the chemical development of said tracks.

12. An apparatus as claimed in claim 1 including a plurality of dosimeters, each being held by the holder and a plurality of electrodes, one electrode being positioned within each dosimeter and connected to every other electrode-containing dosimeter.

13. A method for developing the nuclear tracks produced by neutrons in a plurality of nuclear dosimeters made of an electrically insulating material and sealed at one end thereof by means of an electrolyte capable of chemically attacking said material and disposed at one side of the dosimeter wall and an electrically conducting liquid at the other side of the dosimeter wall, a high voltage not constant in value being applied to said electrolyte and to said liquid across the dosimeter walls, which method comprises the steps of:

inserting the irradiated dosimeters in a tank with an electrically conducting liquid provided with an electrode immersed in said liquid;

filling the dosimeters with an electricity conducting liquid provided with an electrode immersed in said liquid;

filling the dosimeters with an electrictiy conducting liquid, at least one of the conducting liquids within the dosimeter and within the tank being an electrolyte capable of attacking the material of which the dosimeter is made;

immersing an electrode into the liquid within the dosimeter; and connecting the electrode of said dosimeters and the electrode of the tank to said source of non-constant voltage for a length of time as required for obtaining the desired development of the tracks of damage by said neutrons.

14. A method as claimed in claim 13 including the step of inspecting the tracks of damage in said test tubes by means of a beam of light shown parallel to the longitudinal axis of the tube.

* * * * *